(12) United States Patent
Ho et al.

(10) Patent No.: US 12,512,087 B2
(45) Date of Patent: Dec. 30, 2025

(54) SERVER AND CHASSIS THEREOF

(71) Applicant: PEGATRON CORPORATION, Taipei (TW)

(72) Inventors: Chih-Chung Ho, Taipei (TW); Chih-Wei Yu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 114 days.

(21) Appl. No.: 18/655,818

(22) Filed: May 6, 2024

(65) Prior Publication Data

US 2025/0061874 A1 Feb. 20, 2025

Related U.S. Application Data

(60) Provisional application No. 63/533,136, filed on Aug. 17, 2023.

(30) Foreign Application Priority Data

Dec. 15, 2023 (TW) .................................. 112149099

(51) Int. Cl.
*G10K 11/162* (2006.01)
*G10K 11/20* (2006.01)
(Continued)

(52) U.S. Cl.
CPC ............ *G10K 11/162* (2013.01); *G10K 11/20* (2013.01); *H05K 7/1488* (2013.01); *H05K 7/20127* (2013.01)

(58) Field of Classification Search
None
See application file for complete search history.

(56) References Cited

U.S. PATENT DOCUMENTS 6,005,768 A * 12/1999 Jo .......................... G11B 33/08
360/99.18
7,779,960 B2 * 8/2010 Tang .................. H05K 7/20172
181/224

(Continued)

FOREIGN PATENT DOCUMENTS

CN 207488917 U 6/2018
CN 113835500 A 12/2021
(Continued)

*Primary Examiner* — Xanthia C Relford
*Assistant Examiner* — Xanthia C Cunningham
(74) *Attorney, Agent, or Firm* — Muncy, Geissler, Olds & Lowe, P.C.

(57) ABSTRACT

A server includes a chassis and a plurality of hard disk drive modules. The chassis includes a body, a partition, a cover plate, and at least one sound deadening structure. The body includes an opening and an accommodating space. The partition is disposed at the opening. The partition includes a first side surface, a second side surface opposite to the first side surface, and at least one flow channel. The first side surface faces the accommodating space, and the flow channel penetrates the first and the second side surfaces. The cover plate is disposed at the opening. The cover plate includes a plurality of ventilation holes. The sound deadening structure is disposed between the second side surface of the partition and the cover plate. The sound deadening structure includes a sound absorbing element and a reflecting element. The hard disk drive modules are accommodated in the accommodating space.

20 Claims, 7 Drawing Sheets

(51) Int. Cl.
  *H05K 7/14* (2006.01)
  *H05K 7/20* (2006.01)

(56) References Cited

U.S. PATENT DOCUMENTS

| | | | | |
|---|---|---|---|---|
| 10,565,974 | B1* | 2/2020 | Bhatia | G11B 33/08 |
| 11,443,726 | B2* | 9/2022 | Wu | G06F 1/182 |
| 11,523,535 | B2 | 12/2022 | Lee et al. | |
| 2005/0195568 | A1 | 9/2005 | Shyr | |
| 2008/0065245 | A1* | 3/2008 | Tang | H05K 7/20727 |
| | | | | 700/94 |
| 2010/0078258 | A1* | 4/2010 | Tanabe | G10K 11/172 |
| | | | | 181/224 |
| 2010/0307862 | A1* | 12/2010 | Yamauchi | H02K 5/24 |
| | | | | 181/224 |
| 2017/0221526 | A1* | 8/2017 | Albrecht | H05K 7/20736 |
| 2017/0260901 | A1* | 9/2017 | Wilhelm | F02B 63/044 |
| 2018/0330712 | A1* | 11/2018 | Chen | F16L 55/0331 |
| 2019/0159361 | A1* | 5/2019 | Chen | G10K 11/162 |
| 2021/0151024 | A1* | 5/2021 | Wu | H05K 7/20172 |
| 2021/0383784 | A1* | 12/2021 | Leatherdale | G10K 11/168 |
| 2022/0051649 | A1* | 2/2022 | Lin | G10K 11/161 |
| 2023/0021389 | A1 | 1/2023 | Chen et al. | |
| 2023/0317044 | A1* | 10/2023 | Wang | H05K 7/20727 |
| | | | | 181/212 |
| 2023/0317045 | A1* | 10/2023 | Chen | G06F 1/20 |
| | | | | 181/198 |

FOREIGN PATENT DOCUMENTS

| | | |
|---|---|---|
| CN | 113638909 B | 3/2023 |
| TW | I242706 B | 11/2005 |
| TW | M497658 U | 3/2015 |
| TW | 202233044 A | 8/2022 |

\* cited by examiner

SERVER AND CHASSIS THEREOF

CROSS-REFERENCE TO RELATED APPLICATION

This application claims the priority benefits of U.S. provisional application Ser. No. 63/533,136, filed Aug. 17, 2023, and Taiwan application serial no. 112149099, filed Dec. 15, 2023. The entirety of the above-mentioned patent applications is hereby incorporated by reference herein and made a part of this specification.

TECHNICAL FIELD

The present disclosure relates to a server, and in particular to a chassis of a server.

BACKGROUND

Generally speaking, a server includes a variety of precision electronic elements, such as a Hard Disk Drive (HDD), a Central Processing Unit (CPU) and a Graphics Processing Unit (GPU). The performance of the precision electronic elements is easily affected by noise and vibration, and especially the performance of hard disk drives is easily affected by noise.

The current server has a sound absorbing or sound deadening structure inside to reduce the noise generated by the fan inside, thereby reducing vibration. However, there is no effective solution to reduce and block the noise generated outside the server.

SUMMARY

In view of the above problems, a main objective of the present disclosure is to provide a server and a chassis thereof, so as to achieve the effects of both heat dissipation and reduction of outside noise by way of a sound deadening structure of the chassis and the configuration thereof.

In order to achieve the above objective, the present disclosure provides a chassis, applied to a server. The server includes a plurality of hard disk drive modules. The chassis includes a body, a partition, a cover plate, and at least one sound deadening structure. The body includes an opening and an accommodating space, and the hard disk drive modules are accommodated in the accommodating space. The partition is disposed at the opening. The partition includes a first side surface, a second side surface opposite to the first side surface, and at least one flow channel. The first side surface faces the accommodating space, and the flow channel penetrates the first side surface and the second side surface. The cover plate is disposed at the opening of the body. The cover plate includes a plurality of ventilation holes. The sound deadening structure is disposed between the second side surface of the partition and the cover plate and corresponds to the flow channel. The sound deadening structure includes a sound absorbing element and a reflecting element. The reflecting element is disposed on one side surface of the sound absorbing element.

In order to achieve the above objective, the present disclosure further provides a server, including a chassis and a plurality of hard disk drive modules. The chassis includes a body, a partition, a cover plate, and at least one sound deadening structure. The body includes an opening and an accommodating space. The partition is disposed at the opening. The partition includes a first side surface, a second side surface opposite to the first side surface, and at least one flow channel. The first side surface faces the accommodating space, and the flow channel penetrates the first side surface and the second side surface. The cover plate is disposed at the opening of the body. The cover plate includes a plurality of ventilation holes. The sound deadening structure is disposed between the second side surface of the partition and the cover plate and corresponds to the flow channel. The sound deadening structure includes a sound absorbing element and a reflecting element. The reflecting element is disposed on one side surface of the sound absorbing element. The hard disk drive modules are accommodated in the accommodating space.

According to an embodiment of the present disclosure, a density of the sound absorbing element is less than a density of the reflecting element.

According to an embodiment of the present disclosure, a material of the sound absorbing element includes a porous material.

According to an embodiment of the present disclosure, the reflecting element includes a plastic plate or a metal plate.

According to an embodiment of the present disclosure, the reflecting element is disposed on the sound absorbing element and faces the second side surface of the partition.

According to an embodiment of the present disclosure, the flow channel has an inlet. A first distance is formed between the sound deadening structure and the inlet.

According to an embodiment of the present disclosure, a ratio of the first distance to an inner diameter of the flow channel is between 0.5 and 2.

According to an embodiment of the present disclosure, a projective plane of the sound deadening structure projected onto the partition covers the inlet.

According to an embodiment of the present disclosure, a second distance is formed between a side wall of the flow channel and an extension line of a side wall of the sound deadening structure. A ratio of the second distance to the first distance is between 1 and 2.

According to an embodiment of the present disclosure, an end of the flow channel close to the inlet includes a diversion portion.

Based on the above, according to the server and the chassis thereof of the present disclosure, the chassis includes the body, the partition, and the at least one sound deadening structure. The partition and the sound deadening structure are both disposed at the opening of the body, and the sound deadening structure is disposed on the side surface of the partition facing the outside (i.e., the second side surface) and corresponds to the flow channel. When the noise outside the server enters the chassis, the sound energy can be blocked and absorbed by the sound deadening structure first, so as to prevent the outside noise from affecting the performance of the hard disk modules. Additionally, the sound deadening structure includes the sound absorbing element and the reflecting element, and the reflecting element is disposed on one side surface of the sound absorbing element. The sound absorbing element can absorb the sound energy, and the reflecting element can reflect the sound energy into the sound absorbing element, thereby improving the sound deadening effect of the sound deadening structure.

DETAILED DESCRIPTION

Figure 1:
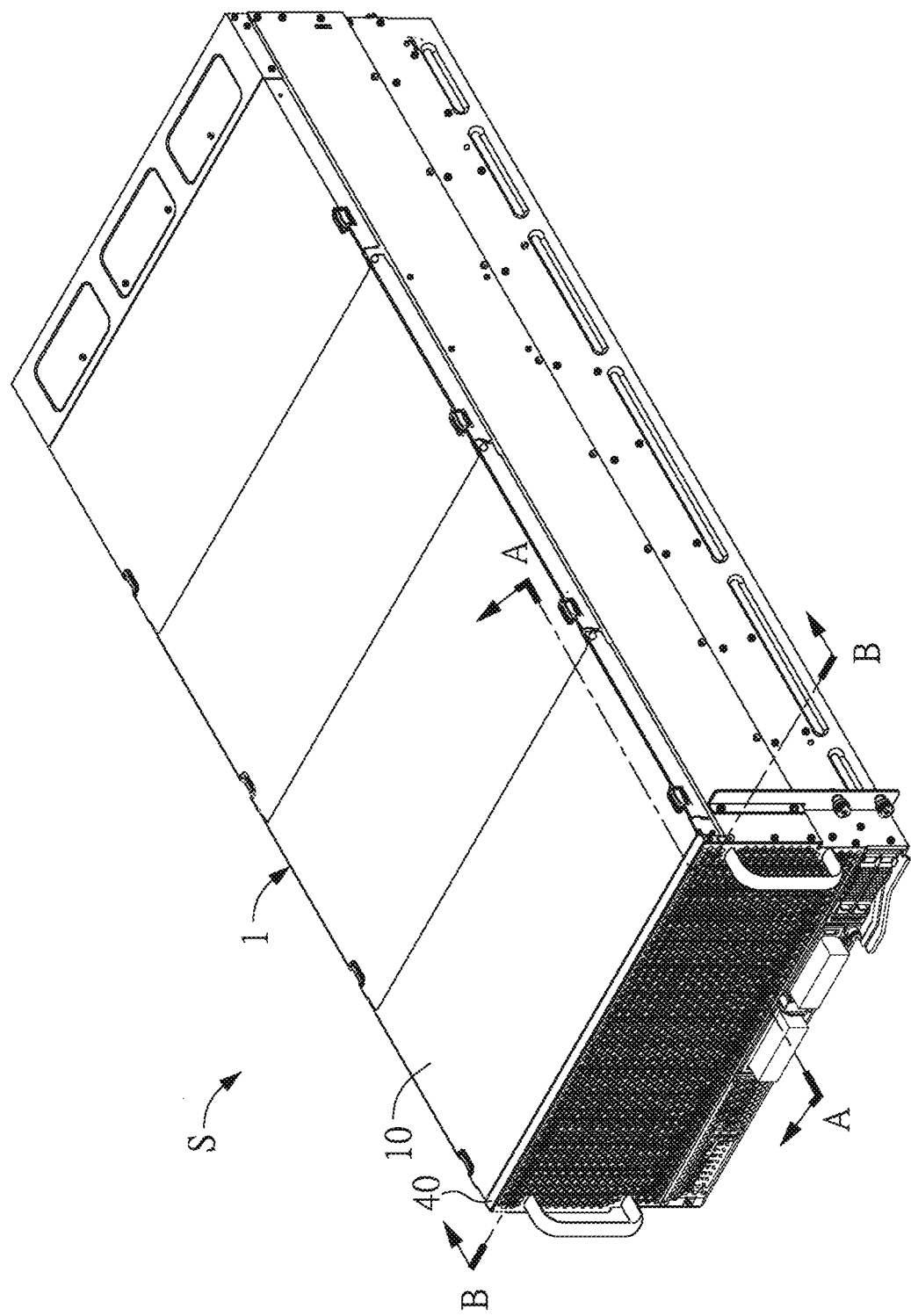
FIG. 1 is a schematic view of a server according to an embodiment of the present disclosure.

In order to better understand the technical contents of the present disclosure, the preferred specific embodiments are described as follows. Specific implementations of the present disclosure will be further described in detail below with reference to the accompanying drawings and embodiments. The following embodiments are merely intended to illustrate the technical solutions of the present disclosure more clearly, but not to limit the scope of protection of the present disclosure.

In the description of various embodiments, the so-called "first" and "second" are used to describe different elements, and these elements are not limited by such predicates. In addition, for the convenience and clarity of description, the maximum width or size of each element in the drawings is exaggerated, omitted or sketched for those skilled in the art to understand and read, and the size of each element is not exactly its actual size, and is not intended to limit the applicable limit conditions of the present disclosure, so it has no technical substantive significance. Any modification of structure, change of proportion or adjustment of size shall still fall within the scope of the technical contents disclosed in the present disclosure without affecting the efficacy and objective that can be achieved by the present disclosure. The same reference numerals in all drawings will be used to indicate the same or similar elements.

Figure 2:
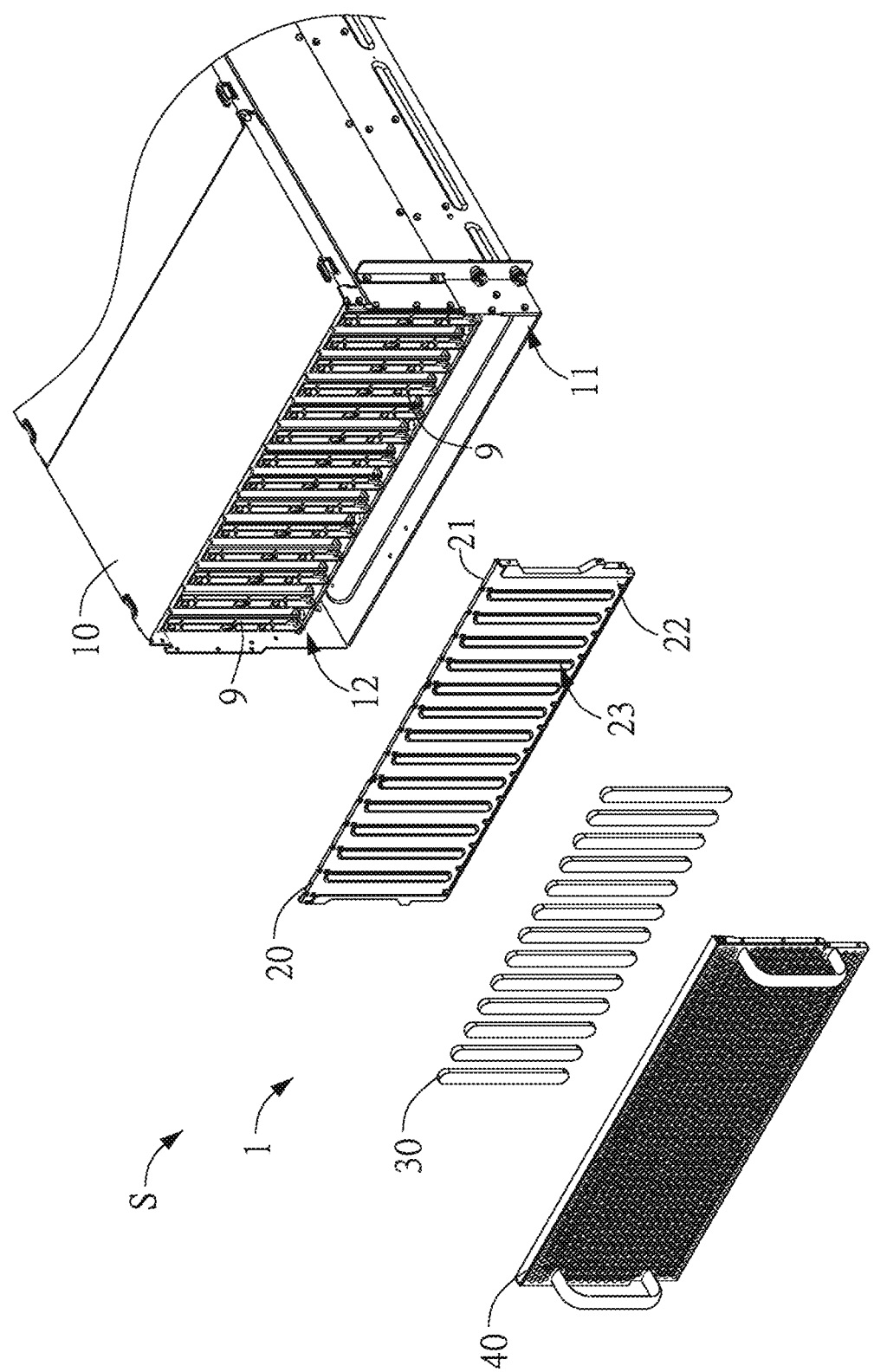
FIG. 2 is a schematic exploded view of the server shown in FIG. 1.
Figure 3:
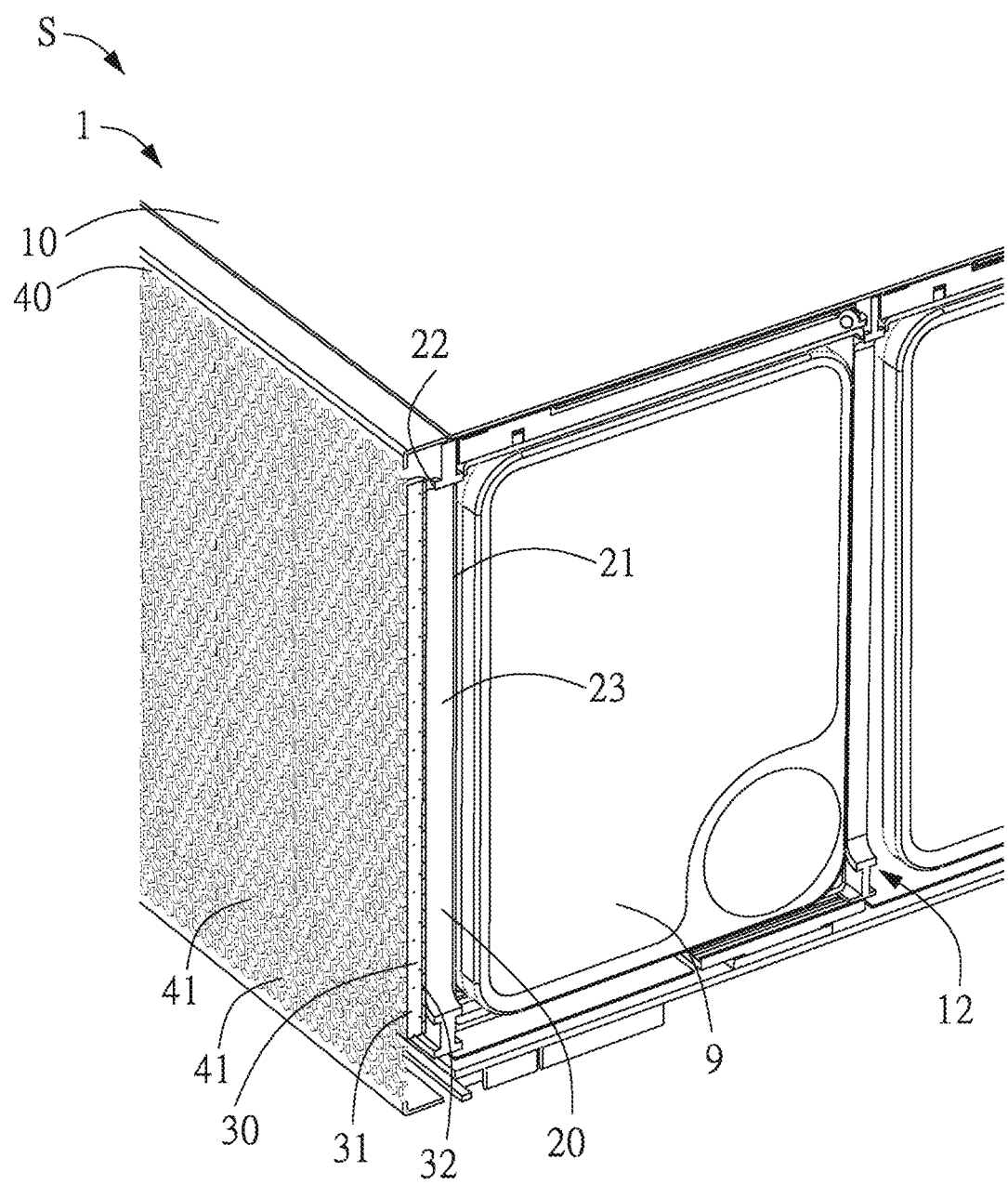
FIG. 3 is a three-dimensional cross-sectional view of the server shown in FIG. 1 taken along line A-A.
Figure 4:
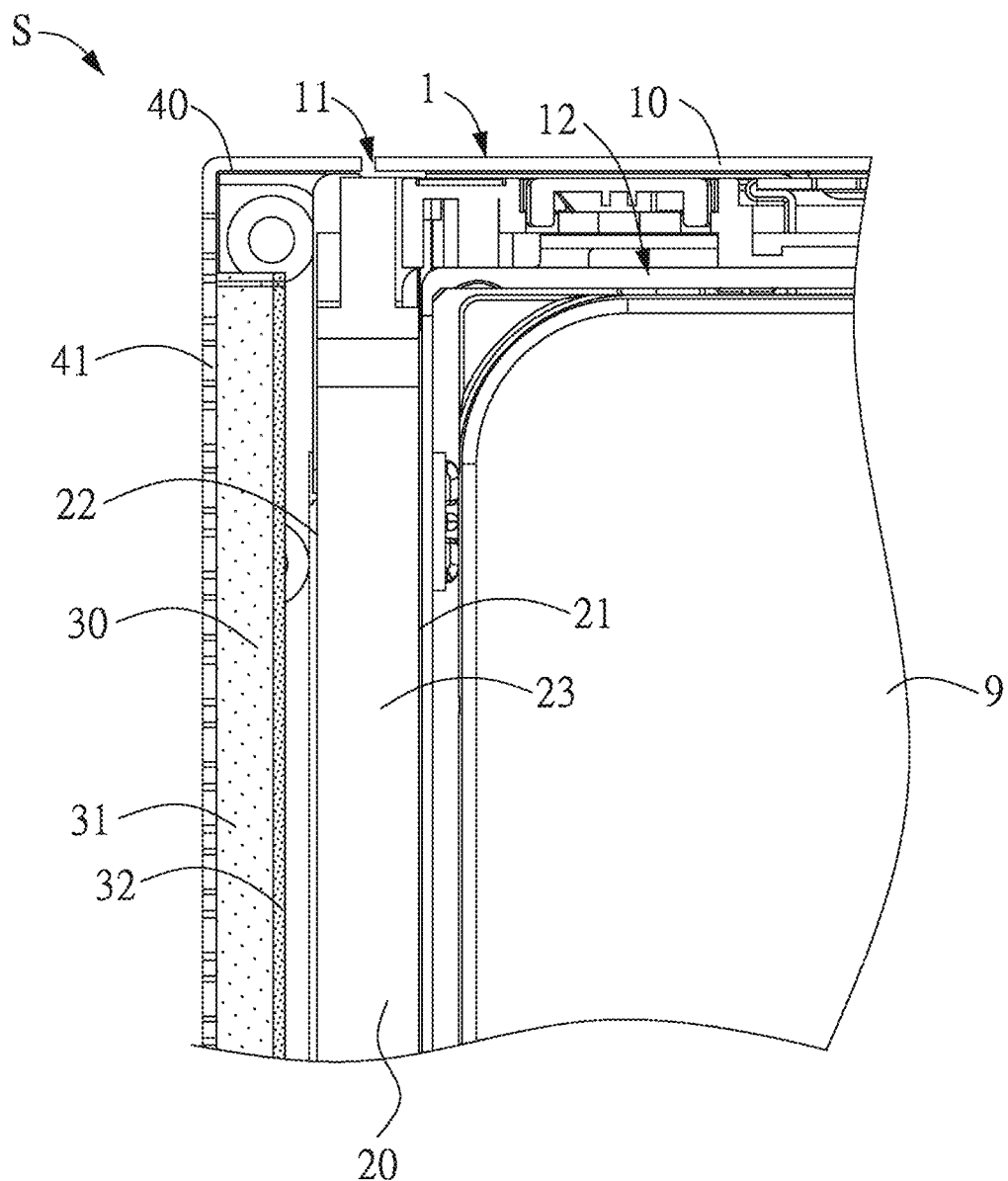
FIG. 4 is a cross-sectional view of the server shown in FIG. 1 taken along line A-A.

FIG. 1 is a schematic view of a server according to an embodiment of the present disclosure. FIG. 2 is a schematic exploded view of the server shown in FIG. 1. FIG. 3 is a three-dimensional cross-sectional view of the server shown in FIG. 1 taken along line A-A. FIG. 4 is a cross-sectional view of the server shown in FIG. 1 taken along line A-A. Referring to FIG. 1, FIG. 2, FIG. 3 and FIG. 4, the server S of this embodiment includes a chassis 1 and a plurality of hard disk drive modules 9. The chassis 1 includes a body 10, a partition 20, at least one sound deadening structure 30, and a cover plate 40. The body 10 includes an opening 11 and an accommodating space 12, as shown in FIG. 2. Additionally, the accommodating space 12 may communicate with an outside of the body 10 through the opening 11. The hard disk drive modules 9 are accommodated in the accommodating space 12 of the body 10 and are close to the opening 11, as shown in FIG. 2 and FIG. 3. It should be noted that the hard disk drive modules 9 shown in FIG. 2 are located in the accommodating space 12 of the body 10.

In this embodiment, the partition 20 includes a first side surface 21, a second side surface 22 opposite to the first side surface 21, and at least one flow channel 23. The flow channel 23 penetrates the first side surface 21 and the second side surface 22, as shown in FIG. 3. It should be noted that the partition 20 in FIG. 3 and FIG. 4 is just cut at the flow channel 23. In this embodiment, the partition 20 is disposed at the opening 11 of the body 10. The first side surface 21 of the partition 20 faces the accommodating space 12, and the second side surface 22 faces the outside of the chassis 1. The flow channel 23 is an air duct for air outside the server S to flow into the chassis 1. Additionally, the partition 20 in this embodiment has a plurality of flow channels 23, and the plurality of flow channels 23 may respectively correspond to the hard disk drive modules 9. Thus, the outside cold air can flow into the chassis 1 through the flow channels 23 and flow through the hard disk drive modules 9, thereby achieving the cooling effect.

Figure 5:
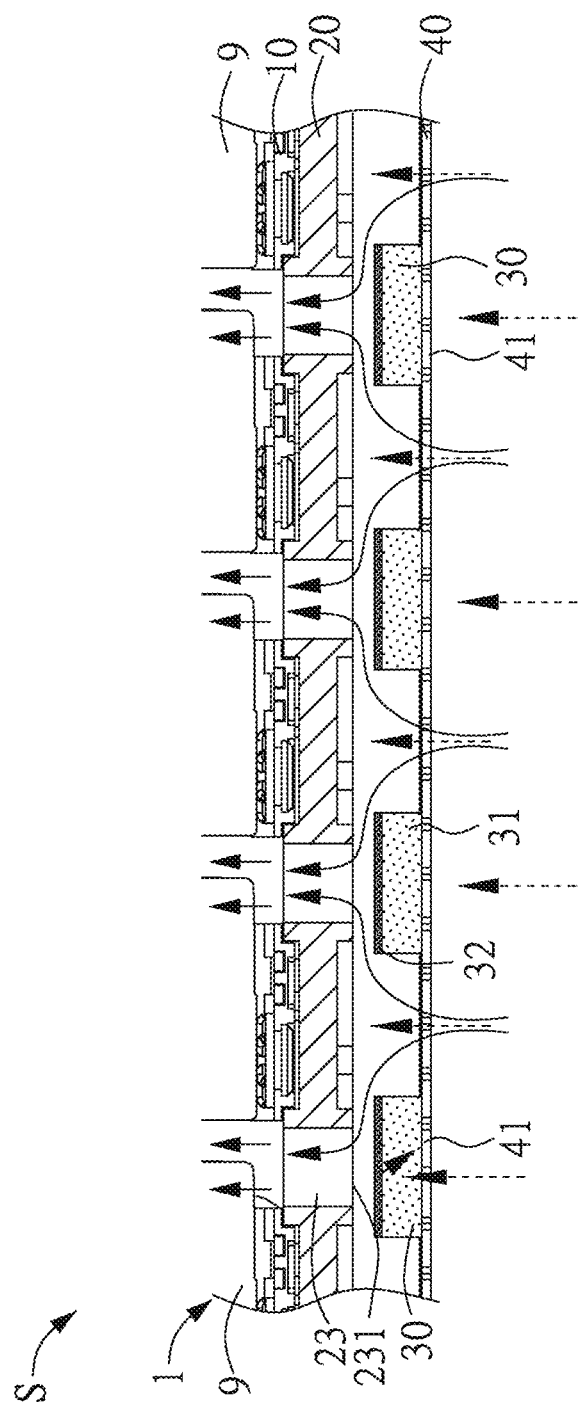
FIG. 5 is a cross-sectional view of the server shown in FIG. 1 taken along line B-B.

In this embodiment, the sound deadening structure 30 and the cover plate 40 are disposed at the opening 11 of the body 10, and the sound deadening structure 30 is disposed between the partition 20 and the cover plate 40. In other words, at the opening 11 of the body 10, the cover plate 40, the sound deadening structure 30 and the partition 20 are sequentially disposed from outside to inside. FIG. 5 is a cross-sectional view of the server shown in FIG. 1 taken along line B-B. Referring to FIG. 2 and FIG. 5, preferably, the number of the sound deadening structures 30 is the same as the number of the flow channels 23, so that the sound deadening structures 30 can respectively correspond to the flow channels 23. Preferably, the sound deadening structure 30 may cover the opening of the flow channel 23, and the opening of the flow channel 23 is called an inlet 231, as shown in FIG. 5. Specifically, the flow channel 23 has an inlet 231, and the inlet 231 of the flow channel 23 faces the outside. A width of the sound deadening structure 30 is greater than an inner diameter of the flow channel 23 and the inlet 231 thereof, so a projective plane of the sound deadening structure 30 projected onto the partition 20 can cover the inlet 231.

As shown in FIG. 3 and FIG. 4, the cover plate 40 includes a plurality of ventilation holes 41. The sound deadening structure 30 is fixed by the cover plate 40. The fixing method for the sound deadening structure 30 and cover plate 40 may include sticking, locking, hot melting or other methods, but is not limited thereto. In addition, the cover plate 40 is often referred to as a front window, so the sound deadening structure 30 of this embodiment is disposed on a side of the cover plate 40 facing the accommodating space 12 of the body 10.

Figure 6:
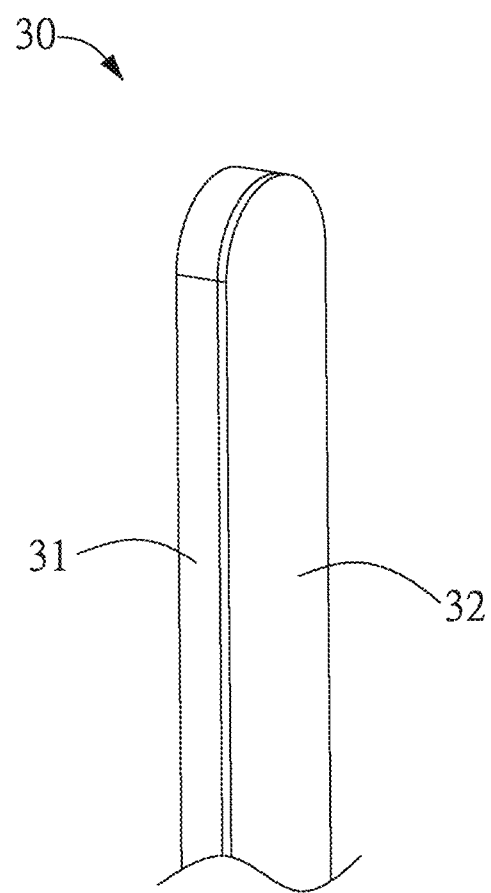
FIG. 6 is a schematic enlarged view of a sound deadening structure shown in FIG. 2.

Since the sound deadening structure 30 is disposed between the cover plate 40 and the second side surface 22 of the partition 20 and close to the opening 11 of the body 10, when noise outside the server S enters the chassis 1, the sound energy can be blocked and absorbed by the sound deadening structure 30 first. FIG. 6 is a schematic enlarged view of a sound deadening structure shown in FIG. 2. Referring to FIG. 2, FIG. 4, FIG. 5 and FIG. 6, in this embodiment, the sound deadening structure 30 includes a sound absorbing element 31 and a reflecting element 32. The reflecting element 32 is disposed on one side surface of the sound absorbing element 31. The sound absorbing element 31 is configured to absorb the sound energy, and the reflecting element 32 may reflect the sound energy into the sound absorbing element 31, thereby improving the sound deadening effect of the sound deadening structure 30. Specifically, a density of the sound absorbing element 31 is less than a density of the reflecting element 32, so that the reflecting element 32 can reflect the sound energy. In this embodiment, a material of the sound absorbing element 31 may include a porous material, such as, sound absorbing foam. The reflecting element 32 may include a plastic plate or a metal plate.

Preferably, the reflecting element 32 is disposed on the sound absorbing element 31 and faces the second side surface 22 of the partition 20. In other words, the sound absorbing element 31 of the sound deadening structure 30 faces (i.e., is close to) the cover plate 40, and the reflecting element 32 faces (i.e., is close to) the partition 20 and the hard disk drive modules 9. Therefore, after the noise outside the server S enters the chassis 1 through the ventilation holes 41 of the cover plate 40 along with the air flow (as shown by the direction arrows in FIG. 5), the noise outside the server S is absorbed by the sound absorbing element 31 of the sound deadening structure 30 first. Next, when the sound energy is transferred to the reflecting element 32, part of the sound energy may be reflected back to the sound absorbing element 31, thereby improving the sound deadening effect of the sound deadening structure 30 and greatly reducing the noise outside the server S.

Figure 7:
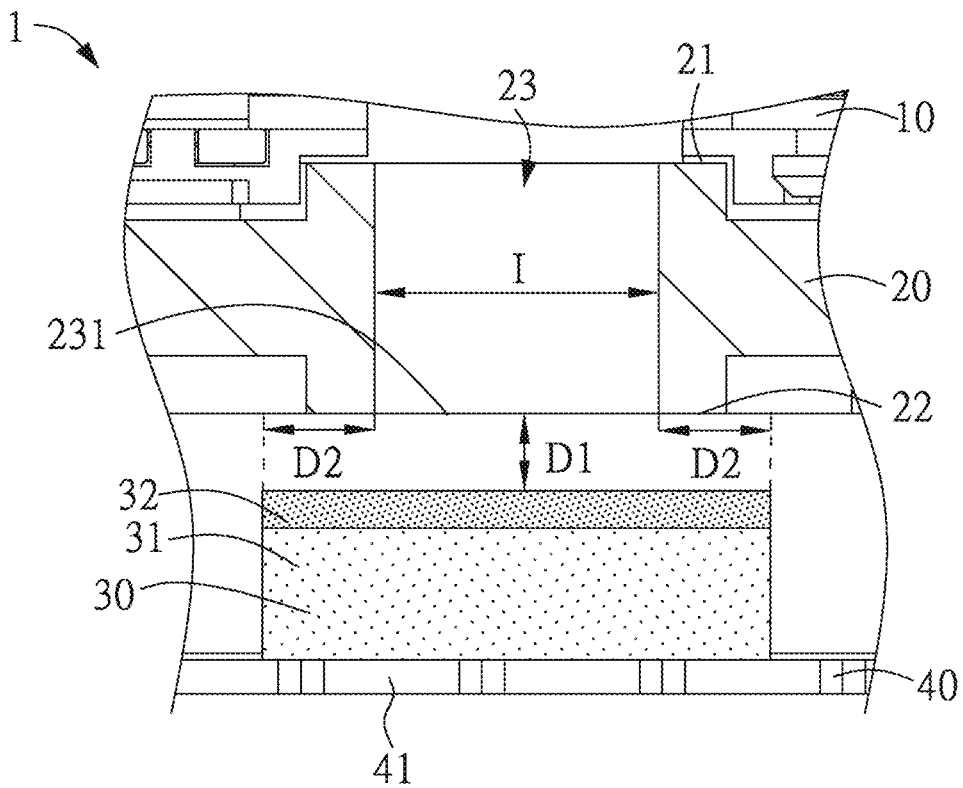
FIG. 7 is a schematic partial enlarged view of the server shown in FIG. 5.

FIG. 7 is a schematic partial enlarged view of the server shown in FIG. 5. Referring to FIG. 5 and FIG. 7, preferably, in this embodiment, a gap is formed between the sound deadening structure 30 and the partition 20. Specifically, a first distance D1 is formed between the sound deadening structure 30 and the inlet 231 of the flow channel 23, as shown in FIG. 7. Therefore, the air flow outside the server S can still flow into the flow channel 23 via the gap between the sound deadening structure 30 and the flow channel 23, and then further flow to the hard disk drive modules 9, as shown by the direction arrows in FIG. 5. Preferably, a ratio of the first distance D1 to an inner diameter I of the flow channel 23 is between 0.5 and 2. For example, if the inner diameter I of the flow channel 23 is 2 centimeters (cm), the first distance D1 may be between 1 centimeter and 4 centimeters.

As described above, in this embodiment, the width of the sound deadening structure 30 is greater than the inner diameter I of the flow channel 23 and the inlet 231 thereof, so the projective plane of the sound deadening structure 30 projected onto the partition 20 can cover the inlet 231. In other words, a second distance D2 is formed between a side wall of the flow channel 23 and an extension line of a side wall of the sound deadening structure 30. Preferably, a ratio of the second distance D2 to the first distance D1 is between 1 and 2. For example, if the first distance D1 is 1 cm, the second distance D2 may be between 1 and 2 cm. By way of the limitations of the first distance D1 and the second distance D2, the air flow outside the server S can still flow into the flow channel 23 so as to cool the hard disk drive modules 9. Moreover, the outside noise can be absorbed by the sound deadening structure 30 so as to avoid affecting the performance of the hard disk drive modules 9.

Figure 8:
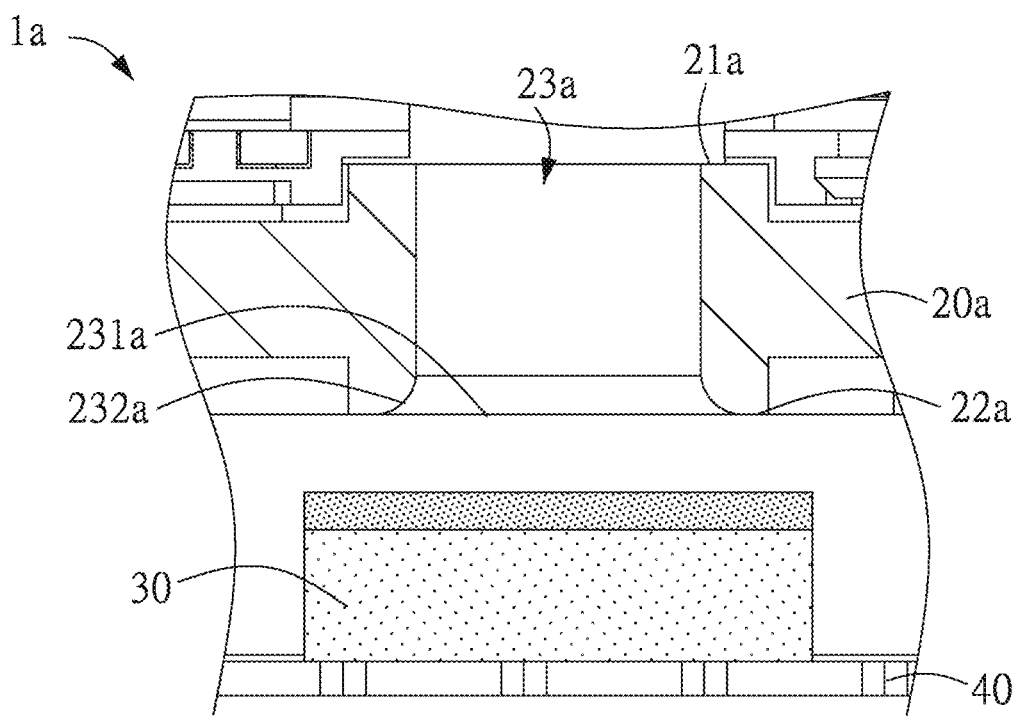
FIG. 8 is a schematic cross-sectional enlarged view of a chassis according to another embodiment of the present disclosure.

FIG. 8 is a schematic cross-sectional enlarged view of a chassis according to another embodiment of the present disclosure. Referring to FIG. 8, the chassis 1a of this embodiment is different from the foregoing embodiment in the partition 20a, so the other elements still use the same element symbols as in the foregoing embodiment. In this embodiment, an end of the flow channel 23a of the partition 20a close to the inlet 231a has a diversion portion 232a. That is, the diversion portion 232a is located at the end of the flow channel 23a close to the inlet 231a. In other words, the diversion portion 232a is close to the second side surface 22a of the partition 20a. Specifically, in this embodiment, an inner wall of the flow channel 23a is mainly a vertical inner wall, and is located in an area at the center of the flow channel 23a and close to the first side surface 21a. An area of the flow channel 23a close to the second side surface 22a and the inlet 231a forms a guide structure different from the vertical inner wall to serve as the diversion portion 232a.

In this embodiment, the diversion portion 232a may be a gradually expanding arc angle or inclined surface. FIG. 8 is an example of a gradually expanding arc angle. The structure of the diversion portion 232a can improve the smoothness of the air flow, so that the air flow can smoothly flow into the flow channel 23a, thereby avoiding turbulence near the inlet 231a.

In addition, the present disclosure further provides a chassis, applicable to the server. For the elements of the chassis and the connection relations thereof, reference may be made to the chassis 1 and 1a of the foregoing embodiments, and details will not be repeated here.

Based on the above, according to the server and the chassis thereof of the present disclosure, the chassis includes the body, the partition, and the at least one sound deadening structure. The partition and the sound deadening structure are both disposed at the opening of the body, and the sound deadening structure is disposed on the side surface of the partition facing the outside (i.e., the second side surface) and corresponds to the flow channel. When the noise outside the server enters the chassis, the sound energy can be blocked and absorbed by the sound deadening structure first, so as to prevent the outside noise from affecting the performance of the hard disk modules. Additionally, the sound deadening structure includes the sound absorbing element and the reflecting element, and the reflecting element is disposed on one side of the sound absorbing element. The sound absorbing element can absorb the sound energy, and the reflecting element can reflect the sound energy into the sound absorbing element, thereby improving the sound deadening effect of the sound deadening structure.

It should be noted that the above embodiments are examples for convenience of explanation, and the scope claimed in the present disclosure shall be based on the claims, and is not limited to the above embodiments.

What is claimed is:

1. A chassis, applied to a server comprising a plurality of hard disk drive modules, the chassis comprising:
   a body, comprising an opening and an accommodating space, the hard disk drive modules being accommodated in the accommodating space;
   a partition, disposed at the opening, the partition comprising a first side surface, a second side surface opposite to the first side surface, and at least one flow channel, the first side surface facing the accommodating space, and the flow channel penetrating the first side surface and the second side surface;
   a cover plate, disposed at the opening of the body, the cover plate comprising a plurality of ventilation holes; and
   at least one sound deadening structure, disposed between the second side surface of the partition and the cover plate and corresponding to the flow channel, the sound deadening structure comprising a sound absorbing element and a reflecting element, and the reflecting element being disposed on one side surface of the sound absorbing element.

2. The chassis according to claim 1, wherein a density of the sound absorbing element is less than a density of the reflecting element.

3. The chassis according to claim 1, wherein a material of the sound absorbing element comprises a porous material.

4. The chassis according to claim 1, wherein the reflecting element comprises a plastic plate or a metal plate.

5. The chassis according to claim 1, wherein the reflecting element is disposed on the sound absorbing element and faces the second side surface of the partition.

6. The chassis according to claim 1, wherein the flow channel has an inlet, and a first distance is formed between the sound deadening structure and the inlet.

7. The chassis according to claim 6, wherein a ratio of the first distance to an inner diameter of the flow channel is between 0.5 and 2.

8. The chassis according to claim 6, wherein a projective plane of the sound deadening structure projected onto the partition covers the inlet.

9. The chassis according to claim 6, wherein a second distance is formed between a side wall of the flow channel and an extension line of a side wall of the sound deadening structure, and a ratio of the second distance to the first distance is between 1 and 2.

10. The chassis according to claim 6, wherein an end of the flow channel close to the inlet comprises a diversion portion.

11. A server, comprising:
 a chassis, comprising:
  a body, comprising an opening and an accommodating space;
  a partition, disposed at the opening, the partition comprising a first side surface, a second side surface opposite to the first side surface, and at least one flow channel, the first side surface facing the accommodating space, and the flow channel penetrating the first side surface and the second side surface; and
  a cover plate, disposed at the opening of the body, the cover plate comprising a plurality of ventilation holes;
 at least one sound deadening structure, disposed between the second side surface of the partition and the cover plate and corresponding to the flow channel, the sound deadening structure comprising a sound absorbing element and a reflecting element, and the reflecting element being disposed on one side surface of the sound absorbing element; and
 a plurality of hard disk drive modules, accommodated in the accommodating space.

12. The server according to claim 11, wherein a density of the sound absorbing element is less than a density of the reflecting element.

13. The server according to claim 11, wherein a material of the sound absorbing element comprises a porous material.

14. The server according to claim 11, wherein the reflecting element comprises a plastic plate or a metal plate.

15. The server according to claim 11, wherein the reflecting element is disposed on the sound absorbing element and faces the second side surface of the partition.

16. The server according to claim 11, wherein the flow channel has an inlet, and a first distance is formed between the sound deadening structure and the inlet.

17. The server according to claim 16, wherein a ratio of the first distance to an inner diameter of the flow channel is between 0.5 and 2.

18. The server according to claim 16, wherein a projective plane of the sound deadening structure projected onto the partition covers the inlet.

19. The server according to claim 16, wherein a second distance is formed between a side wall of the flow channel and an extension line of a side wall of the sound deadening structure, and a ratio of the second distance to the first distance is between 1 and 2.

20. The server according to claim 16, wherein an end of the flow channel close to the inlet comprises a diversion portion.

* * * * *